United States Patent [19]

Woo et al.

[11] Patent Number: 4,856,260
[45] Date of Patent: Aug. 15, 1989

[54] APPARATUS FOR SEALING A WEB OF FILM IN A PACKAGING

[75] Inventors: Lecon Woo, Libertyville; Michael T. K. Ling, Vernon Hills, both of Ill.

[73] Assignee: Baxter International Inc., Deerfield, Ill.

[21] Appl. No.: 258,943

[22] Filed: Oct. 17, 1988

[51] Int. Cl.⁴ .......................... B65B 51/30; B65B 51/14
[52] U.S. Cl. .................................... 53/373; 156/583.1; 156/583.2
[58] Field of Search ............... 53/552, 551, 373; 156/583.1, 583.2; 219/241, 251, 516

[56] References Cited

U.S. PATENT DOCUMENTS

| | | |
|---|---|---|
| 2,725,091 | 11/1955 | Miner et al. . |
| 2,941,575 | 6/1960 | Malmberg et al. . |
| 3,010,866 | 11/1961 | Douchet . |
| 3,574,039 | 4/1971 | Fehr et al. . |
| 3,874,976 | 4/1975 | MacFarland, Jr. . |
| 4,075,818 | 2/1978 | Wright et al. ................ 156/583.2 X |
| 4,108,712 | 8/1978 | Bala et al. ..................... 156/583.2 X |
| 4,288,968 | 9/1981 | Seko et al. .......................... 53/552 X |
| 4,353,776 | 10/1982 | Giulie et al. ................. 156/583.1 X |
| 4,359,361 | 11/1982 | Wright .............................. 53/373 X |
| 4,630,429 | 12/1986 | Christine ........................... 53/373 X |
| 4,761,197 | 8/1988 | Christine et al. . |

FOREIGN PATENT DOCUMENTS 2025177 9/1970 France .

*Primary Examiner*—Horace M. Culver
*Attorney, Agent, or Firm*—Paul E. Schaafsma; Robert M. Barrett; Paul C. Flattery

[57] ABSTRACT

An apparatus for sealing a web of film in a packaging machine. The apparatus includes a sealing bar for heating a web of film to a temperature sufficient to melt at least a portion of the web of film. The sealing bar includes a surface that directly contacts the web of film and does not include a release layer. The surface includes thereon a measuring member for measuring the temperature of the molten area of the film. The apparatus further includes a cooling member for cooling the melted portion of the film to its crystallization point during a cycle time of the packaging machine.

24 Claims, 2 Drawing Sheets

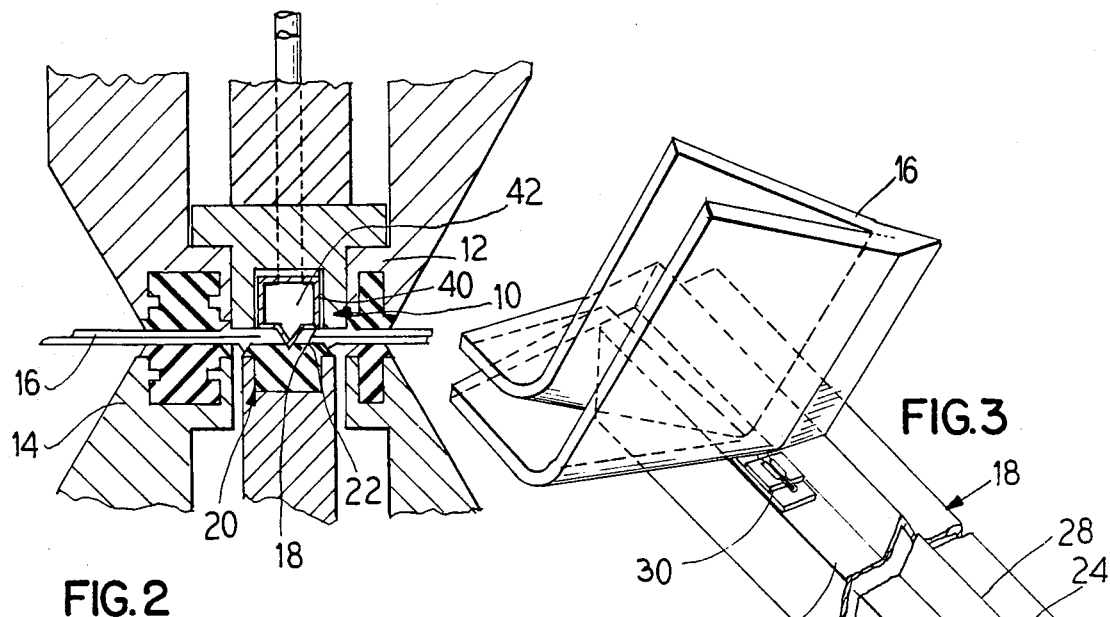
FIG. 2
FIG. 3
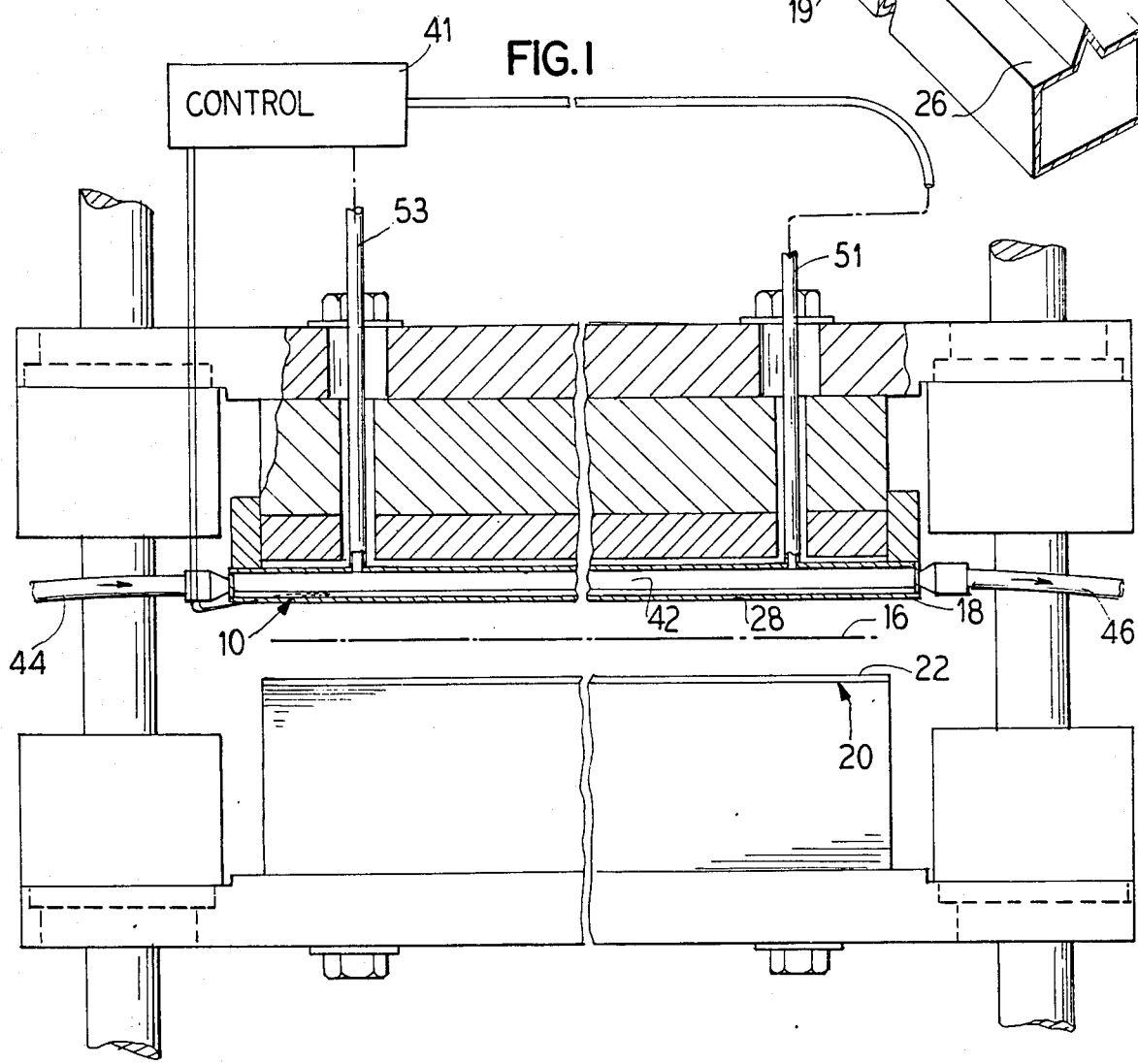
FIG. 1

4,856,260

APPARATUS FOR SEALING A WEB OF FILM IN A PACKAGING

BACKGROUND OF THE INVENTION

The present invention relates generally to an apparatus for sealing a web of film. More specifically, the present invention relates to an apparatus for sealing a web of film in a form, fill, seal packaging machine.

Typically, form, fill, seal packaging machines are utilized to package a product in a flexible container. To this end, form, fill, seal packaging machines are used to seal pharmaceuticals, dairy products, wine, food stuffs, cosmetics, and other products in flexible containers. The form, fill, seal packaging machine provides an apparatus for packaging these products in an expedient manner.

In one type of form, fill, seal packaging machine, a web of heat-sealable film is passed over a former or mandrel that forms the film into a tubular shape. To effect the tubular shape, the film is folded longitudinally and heat-sealed along abutting longitudinal edges. The tubular-shaped film is then passed around a tubular fill system that deposits the product to be packaged into the tubular-shaped film. To create individual packages (hereinafter "bags"), the web of film must be sealed across its width to form side seals. These side seals are usually created by a sealer that creates the second seal for one bag while making the first seal for the next bag. Typically, after the side seals are created, the web of film can then be severed between the seals to create individual bags.

There are a variety of different methods for sealing the web of film to create a seal in the web of film. One method is to utilize a sealing member. In a typical form, fill, seal packaging machine, the sealing member is secured to a set of jaws that are hydraulically actuated to grip the web of film. For example, in creating the side seals, as the jaws grip the web of film, the sealing member is urged against the film welding a portion of the web of film onto itself. Typically, after the hot bar has melted the web of film, a knife is actuated and severs the web of film between the seals to create a flexible bag.

In creating, specifically, the side seals in a web of film, one of the problems inherent therein is heating the web of film to a sufficient temperature so that it is melted and sealed onto itself and cooling same before the packaging machine is cycled to the next step in the process, so that the seals do not come apart or weaken. In a typical form, fill, seal production packaging machine, the cycle time of the machine is approximately 3 seconds. Accordingly, during this 3-second period, the jaws must come together, the web of film must be melted, and then the web of film must be cooled sufficiently so that the film can be advanced to the next stage of the process.

Some of the previous form, fill, seal packaging machines have not sufficiently cooled the web of film during the cycle time and accordingly, resultant bags created by these machines have had an unacceptable number of seal failures. One of the difficulties in cooling the sealing member or bar is that typically, it is covered or coated by a release layer such as a Teflon tape. This release layer prevents film from sticking to the sealing member, but, also makes it difficult to sufficiently cool the sealing member.

The failure to cool the film sufficiently fast typically results in two types of defects. One defect is that the molten material is drawn into a fibrous form resulting in a weaker seal. A second defect is that under internal pressure, the molten seal upon opening the jaw can separate resulting in leaks and/or a weak seal.

In certain industries, the strength of the seals is more critical than in others. For example, in the pharmaceutical industry, flexible bags for housing parenteral or enteral products are typically subjected to drop tests to test their strength. One test that is sometimes utilized is a six foot drop test. Obviously, if the seals are not strong, the flexible bag will not survive a six foot drop.

Another disadvantage with some of the prior form, fill, seal packaging machines is that the web of film is not sufficiently heated or is heated to too great of temperature during the sealing process. Of course, if the web of film is not sufficiently heated, there will not be a sufficient interfacial mixing of the molecules of the film and accordingly, a strong seal will not be created. If the film is heated to too great of temperature, there is a danger that the film will stick to the surface of the sealing member. There is also a danger of film degradation if the film is heated to too great a temperature.

Controlling the temperature to which the film is heated is difficult. In sealing the film there are certain processing uncertainties that have made it difficult to heat the web of film to a specific temperature. These process variables include: powerline fluctuations to the heater; heater resistance change over time; heater resistance change with respect to ambient temperatures; ambient temperature and humidity change; the effect of the filling medium on the heat transfer from the sealing member to the film; power transmission conversion equipment accuracy; power contact resistance changes; and uncertainties and inconsistencies due to the release layer. Furthermore, the release layer must be changed every 6–8 hours due to its degradation.

Although a number of these variables could be eliminated and the remaining ones controlled, if it were possible to measure the temperature on the film, heretofore, it has been difficult to measure the temperature of the web of film as it is being heated. One of the difficulties stems from the fact that the sealing member, which heats the web of film, is either coated with a release layer to prevent the web of film from sticking to the sealing bar, or includes a protective covering, such as a Teflon tape. Thus, it is not possible to measure the temperature of the film and regulate the sealing bar accordingly, because the sealing bar does not directly contact the web of film.

Accordingly, there is a need for an improved apparatus for sealing a web of film in a packaging machine.

SUMMARY OF THE INVENTION

The present invention provides an improved apparatus for sealing a web of film in a packaging machine. The apparatus includes a sealing bar for heating a web of film to a temperature sufficient to melt at least a portion of the web of film. The sealing bar includes a surface that directly contacts the web of film and does not include a release layer. The apparatus further includes means for heating the sealing bar and means for cooling the sealing bar. The means for heating the sealing bar and the means for cooling the sealing bar function to heat and cool the sealing bar during a cycle of the packaging machine. Further, the apparatus includes means for measuring the temperature of a portion of the web of film, the means for measuring being located on the surface of the sealing bar.

In an embodiment, the sealing bar includes a channel and the means for cooling includes fluid that is fed into the channel of the sealing bar.

In an embodiment of the present invention, the apparatus includes means for regulating the temperature of the sealing bar, the means for measuring the temperature of the film cooperating with the means for regulating.

In an embodiment of the present invention, the sealing bar includes means for severing the web of film.

Accordingly, it is an advantage of the present invention to provide an apparatus for sealing a web of film in a packaging machine.

A further advantage of the present invention is to provide an apparatus for sealing a web of film that includes means for measuring the temperature of a molten area of the web of film.

Still an advantage of the present invention is that it provides an apparatus for sealing a web of film that includes means for measuring the temperature of a molten area of the web of film and for regulating the temperature of the sealing bar.

Moreover, an advantage of the present invention is that it provides an apparatus for sealing a web of film that includes a sealing bar that directly contacts the web of film and does not include a release layer.

A still further advantage of the present invention is that it provides an apparatus for sealing a web of film that includes means for sufficiently heating and then sufficiently cooling the web of film during a cycle time of a form, fill, seal packaging machine.

Another advantage of the present invention is that it provides an apparatus for sealing and contemporaneously severing a web of film in a form, fill, seal packaging machine.

Furthermore, an advantage of the present invention is that it provides an apparatus that allows one to control and/or eliminate many process variables found in typical sealing apparatus.

A further advantage of the present invention is that it provides a means for sealing a web of film wherein at the completion of the sealing process, a fully solidified seal having good mechanical strength at near ambient temperatures is created.

Additional features and advantages are described in, and will be apparent from, the detailed description of the presently preferred embodiments and from the drawings.

BRIEF DESCRIPTION OF THE DRAWINGS

FIG. 1 illustrates a perspective view of the apparatus for sealing a web of film of the present invention.

FIG. 2 illustrates a cross-sectional view of the apparatus for sealing taken along lines II—II of FIG. 1.

FIG. 3 illustrates a perspective view of the sealing bar of the present invention.

Figure 4:
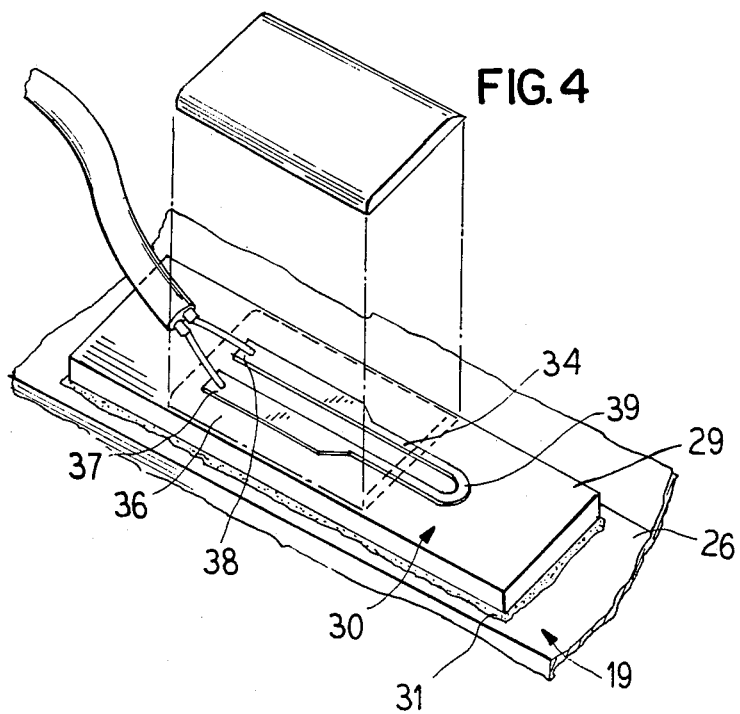
FIG. 4 illustrates a portion of the sealing bar of FIG. 3 and the thermocouple in detail.

DETAILED DESCRIPTION OF THE PRESENTLY PREFERRED EMBODIMENTS OF THE PRESENT INVENTION

The present invention provides an apparatus for sealing a web of film, preferably for use in a form, fill, seal packaging machine. As used herein, the term "form, fill, seal packaging machine" means a packaging machine for creating from a web of film a bag or pouch filled with a product. In a typical form, fill, seal packaging machine, the web of film is folded along abutting longitudinal edges and sealed onto itself. The film is then filled with a product and side seals are created. The web of film is then severed between the side seals to create individual bags.

The embodiment of the present invention as specifically described in the present patent application is directed to creating the side seals in the web of film. Accordingly, the embodiment of the present invention discussed herein provides an apparatus for sealing and severing a web of film. Of course, the sealing apparatus of the present invention can be used at a different stage of the packaging machine, i.e., to create the longitudinal seal edge, as well as can be used in other packaging machines or with other apparatus to seal and/or sever a web of film.

As stated above, the present invention relates to an apparatus for creating seals in a web of film through the use of heat seals. The term "heat seal" refers to an interfacial molecular mixing of the film to achieve a tensile and shear strength approaching that of the base film. To achieve this heat seal, and therefore interfacial molecular mixing, it is necessary to heat the film to a sufficient temperature. However, as set forth in the background of the invention, this must be tempered by the fact that the film must be cooled to a sufficient temperature so that the film can be cycled to the next step of the form, fill, seal packaging machine process.

The present invention provides an improved apparatus for sealing a web of film in that it provides a sealing bar that directly contacts the web of film and includes means for measuring the temperature of the web of film so that the film is sufficiently heated during the sealing process. Furthermore, the present invention provides a means for cooling the sealing bar so that the web of film can be cooled to approximately its crystallization or solidification temperature allowing the film to be released from the jaws and cycled to the next step in the packaging machine without weakening or destroying the side seals.

Referring now to FIGS. 1 and 2, the apparatus 10 for sealing and severing the web of film 16 is illustrated. As illustrated, the apparatus includes a first jaw 12 and a second jaw 14. The jaws 12 and 14 are located on opposide sides of the web of film 16 diametrically opposed to each other. The jaws 12 and 14 function to grip the web of film 16 during the sealing and severing process of the form, fill, seal packaging machine.

Located within the jaw 12 is a sealing bar 18 for sealing and severing the web of film. As discussed in more detail hereinafter, the sealing bar 18 functions to create side seals in the web of film 16 as well as sever the web of film to create individual bags or pouches containing a product.

Located diametric to the sealing bar 18 within the jaw 14 is a back-up member 20. The back-up member 20 includes a resilient face 22 that functions to urge at least a portion of the web of film 16 against the sealing bar 18 so that the web of film can be sealed and severed.

Referring now to FIG. 3, the sealing bar 18 is illustrated. The sealing bar 18, in accordance with the present invention, can be any apparatus for sealing a web of film in a packaging machine. Preferably, the sealing bar 18 is an impulse sealing apparatus. However, due to the novel construction of the sealing bar 18 of the present invention, the sealing bar 18 is so constructed and arranged that it does not require a release coating on the surface thereof. Accordingly, a surface 19 of the sealing bar directly contacts the web of film 16. Preferably, the sealing bar 18 has a construction substantially similar to those disclosed in U.S. Patent application Ser. No. 258,945, entitled: "Improved Apparatus for Sealing and Severing a Web of Film", filed in the name of Lecon Woo et. al. and filed herewith.

As illustrated, the sealing bar 18 includes two plateau regions 24 and 26 and a projecting triangular region 28. The triangular region 28 functions to sever the web of film 16 while the plateau regions 24 and 26 function, along with the triangular region 28, to create the side seals in the web of film 16. Due to the novel construction of the present invention, the sealing bar 18 directly contacts the web of film 16 and does not include a release layer, such as a Teflon tape. As set forth in the background of the invention, in some prior sealing devices, the sealing member is covered or coated by a release layer. When a release layer is used on a sealing bar, due to the slow heat transfer, it is difficult to cool the sealing bar sufficiently and therefore the web of film. Furthermore, the release layer makes it difficult to measure the temperature of the web of film. Because the sealing bar 18 directly contacts the web of film 16, the present invention allows the means for measuring the temperature of the molten area of the film to be located on a surface 19 of the sealing bar.

Accordingly, as illustrated in FIG. 3, located on a surface 19 of the plateau region 26 is a temperature sensor 30. FIG. 4 illustrates a more detailed view of the temperature sensor 30. Preferably, the temperature sensor 30 includes a platform 29 that is bonded to the surface 19 of the sealing bar 18 by an adhesive layer 31. An adhesive that has been found to function satisfactorily is a high temperature ceramic adhesive. The platform 29 is constructed from a nonconducting material, for example, a ceramic. Preferably, located on a top of the platform 29 is a thermocouple 34. An iron constantan as well as a copper constantan thermocouple have been found to function satisfactorily. Preferably, the thermocouple 34 is a foil thermocouple having a thickness of approximately 0.005 of an inch to about 0.0001 of an inch. A thermocouple foil purchased from Omega has been found to function satisfactorily.

Preferably, the thermocouple 34 is encapsulated in a protective sleeve 36. The protective sleeve can be constructed from a ceramic or glass material. As illustrated, the thermocouple 34 includes leads 37 and 38 that allow the thermocouple to be coupled to control means 41 for regulating the temperature of the sealing bar 18. The protective sleeve 36 covers the leads 37 and 38. However, extending from an end of protective sleeve 36 is a butt bonded juncture 39 of the thermocouple 34 for measuring the temperature of the molten area of the film 16.

Because the thermocouple 34 is located directly on the surface 19 of the sealing bar 18 and the sealing bar 18 directly contacts the web of film 16, the temperature of the molten area of the web of film 16 can be directly measured. Therefore, numerous disadvantages of some prior art apparatus wherein the temperature of the molten area of the film could not be measured are overcomed or controlled. Specifically, processing uncertainties and resultant variations in product seal qualities can be controlled or eliminated such as: powerline fluctuations to the heater; heater resistance change over time; heater resistance change with respect to temperature; ambient temperature and humidity changes; filling medium temperature effects on the heat transfer from the sealing bar to the film; power transmission conversion equipment accuracy; power switch contact resistance changes; and uncertainty due to the wearing and age of the release layer. Because the temperature is directly measured from the film itself, these variables can either be eliminated or their impact reduced.

The temperature sensor, including the thermocouple 34, is preferably located at a position where it will not substantially interfere with the seal to be created. For example, if the seal to be created includes chevrons, the thermocouple can be located where the outer area of the chevron will be created.

As previously stated, the sealing bar 18 functions to heat the web of film 16 to a sufficient temperature to cause an interfacial molecular mixing of the molecules of a portion of the web of film 16. To this end, the sealing bar 18 is preferably heated to a temperature approximately 50° C. above the melting point of the web of film 16. To heat the sealing bar 18, a control means 41 is provided. The control means functions to fire, or heat, the sealing bar at certain times as set forth below. The amount of energy supplied to the sealing bar 18 is determined, in part, by the thermocouple 34. Any control means for controlling an impulse system known in the art can be utilized for the control means 41. An example of a control means that has been found to function satisfactorily is a controller manufactured by the Robicon Company of Pittsburgh, Pennsylvania. The sealing bar 18 is coupled to the controlling means by conducting members 51 and 53 secured to near each end of the sealing bar.

Not only is it necessary for the sealing bar 18 to heat the web of film 16 and create seals therein, but it is also necessary for the sealing bar to cool the web of film before the jaws 12 and 14 release the web of film so that the film can be processed to the next step in the form, fill, seal packaging process. As set forth in detail below, the hot bar 18 of the present invention cools the molten area of the web of film 16 to at least its crystallization temperature, which for polyethylene is approximately 120° C. and for polypropylene, polyethylene copolymers is approximately 90° C., within the 3-second time window for cycling the packaging machine.

To this end, as illustrated in FIGS. 1 and 2, the sealing bar 18 includes walls 40 that define therein a channel 42. The walls 40 of the sealing bar 18 are thin in order to allow them to be heated and cooled in an expedient manner. Preferably, the sealing bar 18 has walls 40 having a thickness of approximately 0.02 of an inch to about 0.003 of an inch. Most preferably, the walls have a thickness of 0.005 to about 0.006. Preferably, the sealing bar 18 is constructed from a nichrome tube.

Referring now specifically to FIG. 1, to cool the sealing bar 18, a fluid, preferably, water at ambient temperatures, is caused to flow through the channel 42 of the sealing bar 18. To accomplish this, a second channel 44 is connected to and in fluid communication with the channel 42 and water at ambient temperatures is caused to flow through the second channel 44 into the channel 42. The water then exits the channel 42 through a third channel 46.

Because the sealing bar 18 is constructed as set forth above, and further because the sealing bar does not include a release layer such as Teflon tape or cloth, it is possible to cool the sealing bar, and therefore the molten area of the film, to near ambient temperatures within the 3-second window of the form, fill, seal packaging machine. Moreover, because the sealing bar 18 is sufficiently cooled, the film 16 does not stick to the sealing bar 18. This is due to the fact that the sealing bar 18 is cooled to near ambient temperatures sufficiently rapidly to cool the molten area of the film to near ambient temperatures, therefore the film does not stick to the sealing bar and the film is crystallized or solidified at the seal layer. This is achieved, in part, due to the active cooling to near ambient temperatures of the sealing bar 18.

Figure 5:
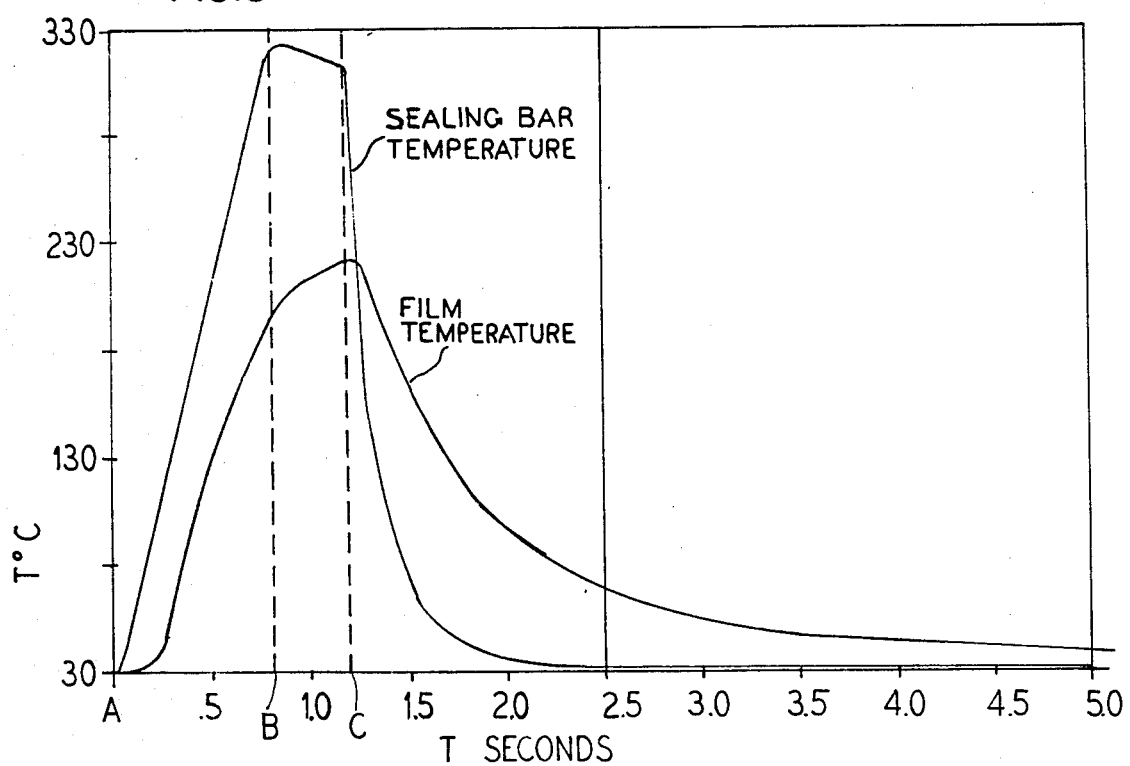
FIG. 5 illustrates a schematic representation of the cycling of the sealing bar of the present invention.

Referring now to FIG. 5, a schematic representation of the cycling of the sealing bar is illustrated. As illustrated, at time A, the sealing bar is fired after the jaws 12 and 14 have clamped the web of film 16 therebetween. During this time, the channel 42 of the sealing bar 18 contains therein a gas, such as air. At time B, the power to the heating element of the sealing bar is turned off. After the sealing bar 18 has been fired to a temperature of approximately 350° C., at time C. a fluid, preferably water at ambient temperature, is introduced into the channel 42. This results in the sealing bar 18, due to its construction, being cooled to near ambient temperatures within the time frame illustrated in the schematic and accordingly, the web of film 16 is crystallized at the seal area. Air is then introduced into the channel 42 causing the water to be pushed out of the channel 42. The jaws 12 and 14 can then be opened and the film 16 can then be cycled to the next step in the form, fill, seal process. As illustrated, the heating and cooling of the film can be accomplished within approximately 2.5 seconds. Accordingly, this is well within the 3-second window required in a typical form, fill, seal packaging machine.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim as our invention:

1. An apparatus for sealing a web of film in a packaging machine comprising:
    a sealing bar for heating a web of film to a temperature sufficient to melt at least a portion of the web of film, the sealing bar including a surface that directly contacts the web of film and does not include a release layer;
    means for heating the sealing bar; means for cooling the sealing bar; the means for heating and the means for cooling functioning to heat and cool the sealing bar during a cycle of the packaging machine;
    and means for measuring the temperature of a portion of the web of film located on the surface of the sealing bar.

2. The apparatus of claim 1 wherein the sealing bar includes a channel and the means for cooling includes fluid that is fed into the channel.

3. The apparatus of claim 1 wherein the means for measuring is a thermocouple.

4. The apparatus of claim 1 including means for regulating the temperature of the sealing bar, the means for measuring cooperating with the means for regulating.

5. The apparatus of claim 1 wherein the sealing bar includes means for severing the web of film.

6. An apparatus for sealing a web of film in a form, fill, seal packaging machine comprising:
    a sealing bar for heating a web of film to a temperature sufficient to melt at least a portion of the web of film, the sealing bar including a surface that directly contacts the portion of the web of film, the sealing bar being coupled to means for heating the sealing bar, the sealing bar further including a channel for receiving a fluid for cooling the sealing bar to a temperature sufficient to prevent the portion of the film from sticking to the sealing bar after the sealing bar melts the portion of the web of film;
    and means for measuring the temperature of the portion of the film and regulating the temperature of the sealing bar located on the surface of the sealing bar.

7. The apparatus of claim 6 wherein the means for heating and fluid for cooling cooperate to heat the sealing bar to a temperature sufficient to melt the portion of the film and cool the sealing bar to a temperature sufficient to cause the melted portion of the film to crystallize during a cycle of the form, fill, seal packaging machine.

8. The apparatus of claim 6 wherein the means for measuring is a thermocouple.

9. The apparatus of claim 8 wherein the thermocouple has a cross-sectional thickness of approximately 0.005 to about 0.0001 of an inch.

10. The apparatus of claim 6 wherein the sealing bar is substantially hollow.

11. The apparatus of claim 10 wherein the sealing bar has walls having a cross-sectional thickness of approximately 0.02 to about 0.003 of an inch.

12. The apparatus of claim 6 wherein the sealing bar includes means for severing the web of film.

13. The apparatus of claim 6 wherein the apparatus seals a web of film in less than approximately three seconds.

14. The apparatus of claim 12 wherein the means for severing includes a raised portion on the sealing bar.

15. The apparatus of claim 8 wherein the thermocouple is secured to the sealing bar by a ceramic adhesive.

16. The apparatus of claim 8 wherein the thermocouple is an iron constantan or copper constantan thermocouple.

17. An apparatus for sealing and severing a web of film in a form, fill, seal packaging machine comprising:
    an impulse sealing bar for heating a web of film to a temperature sufficient to melt at least a portion of the web of film, the sealing bar including a surface that directly contacts the portion of the web of film, the sealing bar is coupled to an electrical source for heating the sealing bar, the sealing bar further including a channel for receiving a fluid for cooling the sealing bar to a temperature sufficient to prevent the portion of the film from sticking to the sealing bar after the sealing bar melts the portion of the web of film and means for severing the web of film; and
    a thermocouple for measuring the temperature of the portion of the film and through feedback control means regulating the temperature of the sealing bar secured to a surface of the sealing bar.

18. The apparatus of claim 17 wherein the thermocouple has a thickness of approximately 0.005 to about 0.0001 of an inch.

19. The apparatus of claim 17 wherein the sealing bar is substantially hollow.

20. The apparatus of claim 19 wherein the sealing bar has walls having a cross-sectional thickness of approximately 0.02 to about 0.003 of an inch.

21. The apparatus of claim 17 wherein the apparatus seals a web of film in less than approximately three seconds.

22. The apparatus of claim 17 wherein the means for severing includes a raised portion on the sealing bar.

23. The apparatus of claim 17 wherein the thermocouple is secured to the sealing bar by a ceramic adhesive.

24. The apparatus of claim 16 wherein the thermocouple is an iron constantan or copper constantan thermocouple.

* * * * *